United States Patent [19]

Busch

[11] Patent Number: 4,832,011

[45] Date of Patent: May 23, 1989

[54] ATTACHMENT FOR PERSONAL PROTECTIVE RESPIRATOR

[75] Inventor: Ewald U. Busch, Knoxville, Tenn.

[73] Assignee: Innovative Engineering, Inc., Knoxville, Tenn.

[21] Appl. No.: 146,567

[22] Filed: Jan. 21, 1988

[51] Int. Cl.[4] ........................ A62B 27/00; G01M 3/00

[52] U.S. Cl. .......................... 128/202.13; 128/201.23; 128/206.24; 73/40

[58] Field of Search ...................... 128/202.13, 201.23, 128/205.25, 206.21, 206.23, 206.24, 206.25, 206.26, 719, 730; 73/40.7, 40, 40.5 R

[56] References Cited

U.S. PATENT DOCUMENTS

| | | | |
|---|---|---|---|
| 3,580,051 | 5/1971 | Bleirns | 73/40 |
| 4,146,025 | 3/1979 | Warncke et al. | 128/201.23 |
| 4,674,492 | 6/1987 | Niemeyer | 128/206.24 |
| 4,765,325 | 8/1988 | Crutchfield | 128/201.23 |

FOREIGN PATENT DOCUMENTS

| | | | |
|---|---|---|---|
| 8702898 | 5/1987 | European Pat. Off. | 128/201.23 |
| 698045 | 10/1940 | Fed. Rep. of Germany | 73/40 |
| 730322 | 1/1943 | Fed. Rep. of Germany | 73/40 |

*Primary Examiner*—Edgar S. Burr
*Assistant Examiner*—Kimberly Asher
*Attorney, Agent, or Firm*—Luedeka, Hodges & Neely

[57] ABSTRACT

An attachemnt for use in testing the fit of a personal protective respirator, i.e. a mask, in situ on the face of the user. The attachment is further useful in testing combinations of respirators and filters in the presence of challenge atmospheres in a rapid and efficient manner.

8 Claims, 3 Drawing Sheets

ATTACHMENT FOR PERSONAL PROTECTIVE RESPIRATOR

This invention relates to respirators, i.e. masks, of the negative pressure type and particularly to an attachment for use in testing, in situ, the fit of a respirator to the face of a user.

Respirators are commonly used as protection against inhaling airborne contaminants. The airborne contaminants may be gaseous or liquid droplets or solid particulates entrained in a gas such as air. Dusts, paint spray mist, fumes and gaseous organic solvents are examples of such substances. These respirators are either of the positive pressure type where clean air is forced under pressure into the respirator for breathing by the user, or the negative pressure type where the inhalation of the user draws ambient environment into the respirator for breathing. In the latter instance, the respirator is provided with means, such as one or more filter cartridges, which extract airborne contaminants from the environment as it is drawn into the respirator, thereby rendering the environment suitable for breathing.

Leakage of contaminated ambient environment into the respirator without passing through the filter cartridges, such as between the peripheral edges of the respirator and the user's face, is a serious consideration in negative pressure type respirators. Such leakage defeats the purpose of the respirator and results in the user inhaling the contaminant.

Three agencies are involved with the control, regulation or recommendation as to the acceptable practice in regard to respirator protection and equipment therein. These agencies are The National Institute of Occupational Safety and Health (NIOSH) , Occupational Safety and Health Administration (OSHA), and American Congress of Governmental Industrial Hygiene (ACGIH) . NIOSH has the principal responsibility for testing and certifying respiratory protection equipment to include both face pieces, cartridges and assemblies testing. Criteria is established by NIOSH based upon extensive medical evaluation of exposure indices and toxicological testing. Based on these scientific studies NIOSH has recommended safe exposure levels for occupational substances.

OSHA has been mandated by Congress to establish safe workplace conditions and to promulgate laws to enforce such conditions. OSHA has public hearings before promulgation of such occupational levels. Once the law has been instituted by Congress, OSHA is mandated to enforce the newly passed legislation. Traditionally OSHA has promulgated laws to reflect the permissible exposure levels (PEL's) which establishes the average conditions employees cannot exceed. ACGIH is an agency which has established occupational exposure levels to hazardous substances in the workplace since the 1930's. ACGIH has been a concensus industry standard and generally has established "Ceiling Concentrations" and Threshold Limit Values (TLV's) which define concentration levels to which nearly every worker can be exposed without any deleterious health effect. Time Weighted Average (TWA) , another related measurement of concentration, is used within the health discipline to refer to average concentration per limit of time, normally an eight hour work day.

Respirators are tested against the TWA and/or TLV of a particular hazardous substance to establish the efficiency of the respirator. The testing involves fitting the respirator on a manikin or the like, drawing the ambient environment through the respirator filter cartridges and measuring the concentration, if any, of the challenge substance which passes through the filter media. This procedure is repeated for sufficient different concentrations of the hazardous substance in the ambient atmosphere to establish the concentration at which the respirator fails to extract the hazardous substance. This concentration then is determined as a multiple of the TWA or TLV and such multiple is the "engineered number" assigned to the respirator and filter combination for the tested hazardous material. For example, if the TWA of the hazardous substance is 50 ppm and the respirator is found to be effective in environments containing 500 ppm, the respirator would be assigned 10 as its engineered number. Each respirator and filter combination is tested for typical airborne contaminants for which the respirator and filter are intended to be effective and an appropriate engineering number is assigned.

It now appears that the engineering number of a respirator is also a function of the leakage allowable. Specifically, if a respirator has an engineered number of 10, and if there were 10% leakage inward of unfiltered environment, the user would be inhaling part filtered and part unfiltered (10% of 500 ppm in the above example) environment. The unfiltered environment thus would have a concentration of 50 ppm which is the TLV of the hazardous substance. Therefore, at 10% leakage, the user would remain protected, but only at the 50 ppm concentration level, not the original 500 ppm level. It thus appears that if the leakage were reduced by one-half, i.e. to 5%, for example, the same respirator and filter would protect the worker in environments of 250 ppm concentration.

Assuming a 100% effective filter cartridge, leakage of a respirator of the negative presure type is determined by the fit of the respirator to the face of the user. Therefore, as used herein, the term "leakage" refers to the passage of ambient environment into the interior of the respirator through a passage other than through the filter. Respirators normally are supplied in "small", "medium" and "large" sizes in half-face and full-face configurations. To aid in establishing an effective seal between the respirator and the user's face, the usual respirator is provided with a resilient peripheral rim for engaging the face and is held in position on the face by a series of adjustable straps. An initial fitting operation in the prior art involves selecting a small, medium, or large respirator from the inventory, applying the respirator to the user, placing the user in a controlled challenge atmosphere, causing the user to breathe, and capturing a portion of the gas from inside the respirator for analysis for the "challenge" substance. This process is repeated as many times as necessary, with intervening fit adjustments (often involving a swap of respirator sizes), until an acceptable level of the challenge substance is detected within the respirator.

A major problem in this prior art technique is that there must be provided on each respirator a means for withdrawing gas from the interior of the respirator. Heretofore, this has been accomplished by using specially prepared respirators with sampling probes inserted through a port in the front of each respirator. After the respirator is placed on the user, the probe is connected to a gas analyzer, for example, to carry out the required analysis. These ported respirators are specially constructed and are not suitable for field use, because of their cost and of the presence of the open port. Thus, it is necessary that a testing facility maintain an expensive inventory of ported respirators available for use in fit testing.

Because each test respirator is used many times and often by different persons, each respirator must be cleaned and sanitized following its use in a fitting test before it is used by another person. Such cleaning and sanitizing, to be effective, must be carried out properly and thoroughly, and therefore represents a significant expense. It also represents a potential liability to the testing agency should the sanitizing not be effective to destroy carriers of communicable diseases. Transmissions of AIDS virus has become a serious concern in respirator fitting testing as heretofore carried out.

Fitting of a respirator as outlined above has another major flaw, that being that the fit test is carried out with a surrogate ported respirator, not with the respirator that the user will be using on a day to day basis. The potential problems associated with such procedure will be readily apparent, such as the failure of the respirator actually used daily to conform to the user's face the same as the test respirator, failure of the respirator/filter combination to perform the same as the test respirator, etc.

It is therefore an object of the present invention to provide an attachment for a respirator which is effective for use in testing the fit of the respirator while the respirator is on the face of the user.

It is another object of this invention to provide a disposable attachment for use in testing the fit of a respirator to the face of a user.

It is another object of this invention to provide an attachment of the type described wherein the fitting test of the respirator to the user is carried out under conditions which minimize the risk of transfer of communicable diseases.

It is another object of this invention to provide an attachment of the type described wherein the attachment is relatively inexpensive, and convenient to use.

It is another object of the invention to provide an attachment of the type described wherein the attachment is capable of alternatively defeating the exhalation valve of the respirator or supplanting such exhalation valve.

It is another object of the present invention to provide a method for testing the fit of a respirator to the face of the user.

Other objects and advantages of the invention will be recognized from the following description and the drawings in which.

BRIEF DESCRIPTION OF THE INVENTION

Briefly stated, the present invention comprises an attachment to be used in the test fitting of a respirator to the face of the user, employing the respirator which the user will be using on a day to day basis. The attachment comprises a generally tubular housing having wall means and first and second open opposite ends that define a chamber therebetween. The attachment is adapted at one of its ends to be fitted onto the existing exhalation valve of the respirator in lieu of the usual protective shield for such exhalation port. Provision is made for alternatively defeating the exhalation flap valve normally present in the respirator or supplanting this exhalation valve with valve means contained within the attachment.

The housing is provided with a port suitable for receiving tubing for connecting the interior chamber of the attachment at a point contiguous to the exhalation port to a conventional gas analysis system. The present attachment is simple in design, relatively inexpensive to manufacture, and therefore disposable. Most importantly, the attachment provides for fitting of the actual respirator employed by the user in day to day use as opposed to use of a specially designed test respirator, thereby insuring that the fit is truly representative of the fit that the user will be experiencing on a day to day basis.

It will also be recognized that the present attachment can be employed in the testing of the respirator on manikins, etc. in determining and assigning an engineered value to a respirator. Accordingly, it no longer is required that a test respirator be manufactured with a "built-in" port for testing purposes, but rather the present attachment can be readily affixed to a "working" respirator, the respirator tested, the attachment removed, and the respirator placed in service. The affixation of the present attachment to the respirator is quick and simple. Its location on the respirator is effective to provide a true representation of the infiltration of hazardous substance into the respirator.

DETAILED DESCRIPTION OF THE INVENTION

Figure 1:
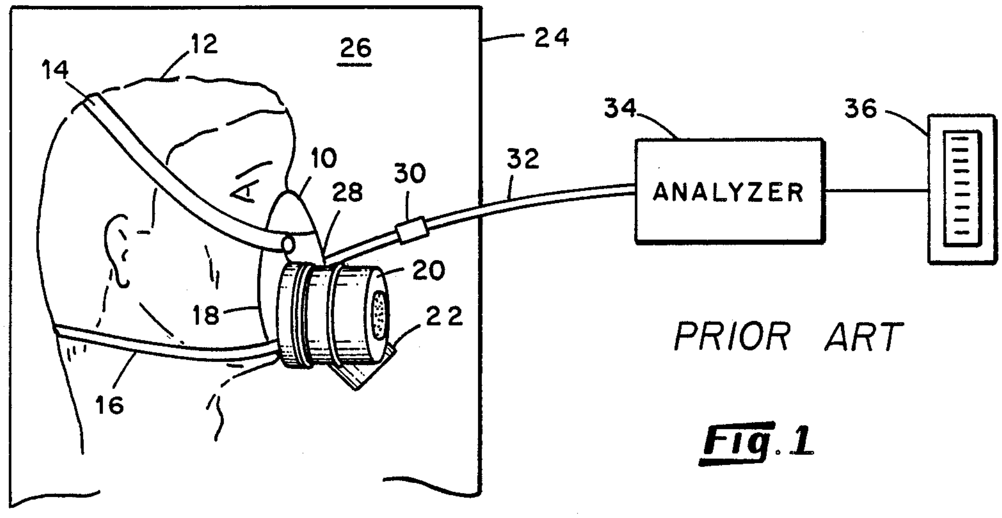
FIG. 1 is a schematic representation of a system for testing the fit of a respirator to the face of the user.
Figure 2:
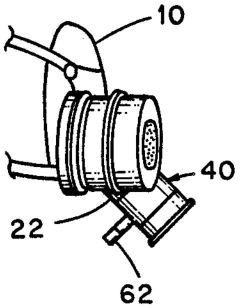
FIG. 2 is a representation of a respirator with the attachment of the present invention affixed thereto.
Figure 3:
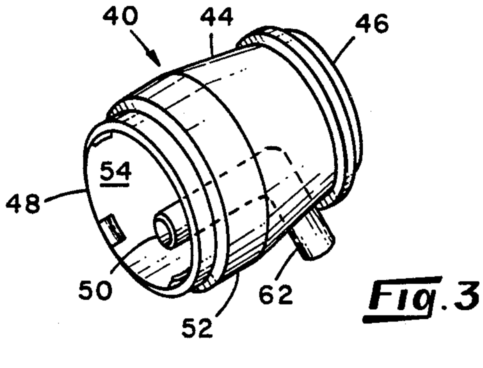
FIG. 3 is a perspective view of the attachment of the present invention.
Figure 6:
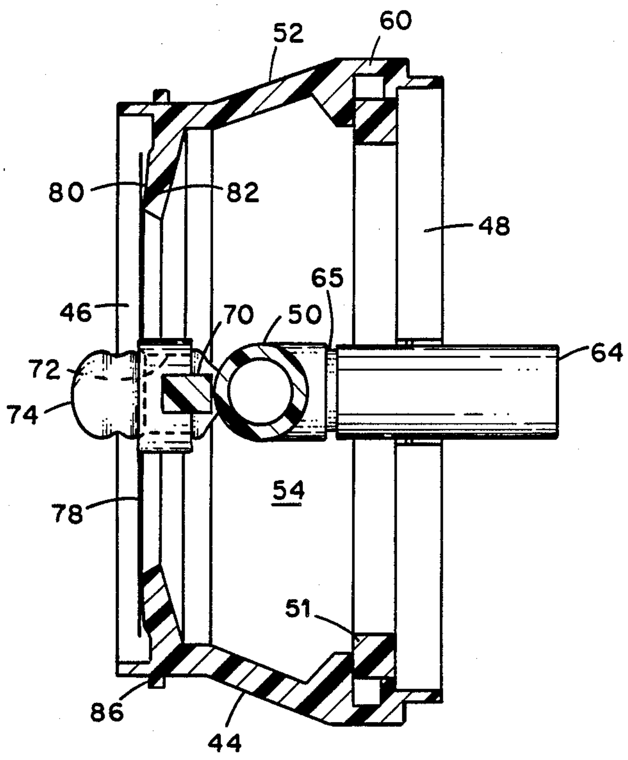
FIG. 6 is a sectional view of the attachment shown in FIG. 4 as taken along the line 6—6 of FIG. 4.
Figure 4:
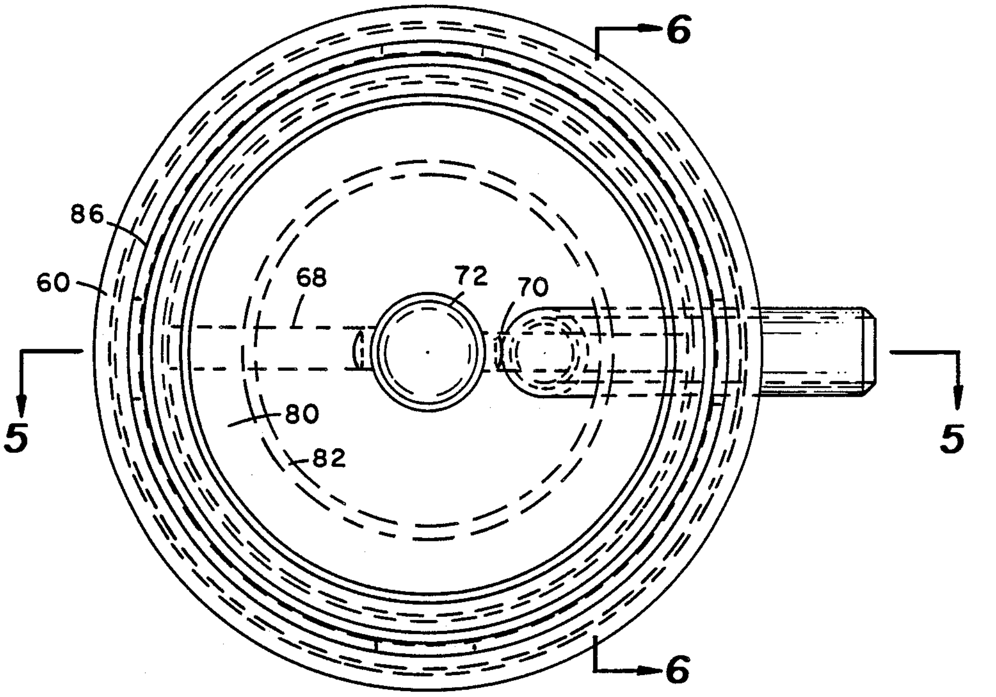
FIG. 4 is an end view of the attachment shown in FIG. 3, as viewed from the outboard end of such attachment.

With reference to the several drawings, testing of the fit of a respirator 10 to the face of a user 12 is commonly accomplished by affixing the respirator 10 to the face of the user covering at least the nose and mouth of the user. The respirator is held in place by means of straps 14 and 16 that are adjustable in length and/or elastic in nature to permit the user to draw the respirator snugly against the face to ensure intimate and sealing contact between the peripheral rim 18 of the respirator and the user's face at all positions around the peripheral rim 18 of the respirator. The respirator is further provided with one or more filter cartridges 20 and an exhalation port 22 which is fitted with a one-way valve (not shown in FIG. 1) which is generally of the flap valve type (See FIG. 5). Thus, when the user inhales, ambient environment is drawn inwardly into the mask through the filter 20 and into the user's lungs. When the user exhales, the gases exhaled pass through the respirator, mixing with whatever environment is present in the interior of the respirator and passing outward through the exhalation valve 22.

In the prior art method of testing for the fit of the respirator to the face of the user, the user with the respirator in place was placed within an enclosure indicated generally at 24 which had a simulated hazardous environment in the interior 26 thereof. While in such simulated hazardous environment, the user was instructed to breathe and possibly even conduct head movements such as might be anticipated to be encountered when the respirator was in use in an actual working environment. As the user breathes, a portion of the gas from the interior of the respirator was withdrawn, as through a port 28 which was connected as by a connector 30 to a conduit 32 that in turn was connected to a conventional analyzer 34 such as a gas analyzer or, in the case of dust, a particle counter. Commonly the gas analyzer is connected to a recorder such as a strip recorder 36. It is to be noted that in the prior art testing of respirators, there was no change in the exhalation valve at the exhalation port 22 so that a substantial portion of the inhaled and subsequently exhaled gases were exhausted from the interior of the respirator without being subject to withdrawal through the port 28.

In accordance with the present invention, the respirator 10 is provided with an attachment 40 which is affixed to the exhalation port 22 of the respirator. It will be recognized that the gases passing to the analyzer, when employing the attachment of the present invention, include all of the gases exhaled from the interior of the respirator, including any gases leaking into the the interior of the respirator plus the gases exhaled by the user. Accordingly, a truly representative composition of gas from the interior of the respirator is passed to the analyzer.

Figure 5:
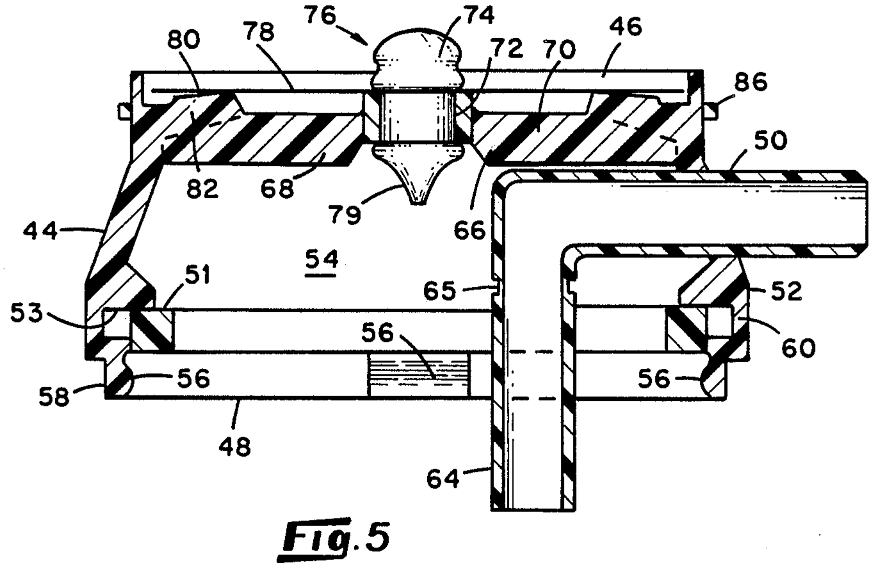
FIG. 5 is a sectional view of the attachment, taken along the line 5—5 of FIG. 4.

With reference to FIGS. 3 through 6, there is depicted a preferred embodiment of the attachment of the present invention. As shown in the Figures, the present attachment comprises a tubular housing 44 having opposite open ends 46 and 48. The housing is hollow and includes a sampling tube 50 that passes through the wall 52 of the housing to provide a fluid passageway from ambient environment to the interior chamber 54 of the housing 44. As shown more specifically in FIGS. 4, 5 and 6, the housing 44 is provided at its open end 48 with a series of locking lugs 56 about the interior circumferential rim 58 of the opening 48 that are adapted to engage a existing annular shoulder provided on the exterior periphery of the exhalation valve 22 of a conventional respirator. The wall 52 may be of a flexible material, e.g. polypropylene, that will permit sufficient deflection of the rim 58 to permit engagement of the lugs 56 with the aforesaid exterior annular shoulder on the exhalation valve 22. In the depicted embodiment, the wall 52 is provided with an annular reduced wall thickness portion 60 adjacent to the rim 58 to enhance the distortion of the rim 58 to permit the acceptance of the lugs 56 by the aforesaid annular shoulder on the exhalation valve. Upon receipt of the lugs by the annular shoulder on the exhalation valve, the rim resiliently returns to its position as shown in FIG. 5 to affix the housing 44 to the exhalation valve 22. An annular seal means 51, such as a rubber gasket, is disposed interiorly of the housing 44 between an annular shoulder 53 and the outboard end of the exhalation valve 22 to seal against the flow of gas between these elements at their juncture.

As noted, a gas sampling tube 50 is provided through the wall 52 of the housing 44. The outboard end 62 of the tubing 50 is adapted to receive thereon a conduit 32 for withdrawing gas from the interior of the chamber 54 for analysis. The opposite end of the tubing 50 terminates interiorly of the respirator at a location contiguous to the exhalation port 22. In the embodiment depicted in FIG. 5, the interior end 64 of the tubing 50 is of sufficient length to bypass the conventional flap valve (not shown) of the exhalation port 22 to terminate just slightly interiorly of such flap valve. When employing a tubing of the nature described, it is unnecessary to remove the existing flap valve within the exhalation port 22, but rather, the end 64 of the tubing 50 defeats the seal of the flap valve. As further depicted in FIG. 5, the inward end 64 of the tubing 50 is provided with a reduced wall thickness at a location within the chamber 54 defined by the housing 44. This reduced annular wall thickness provides a "break-away" location so that the tubing 50 can be caused to terminate on the outboard side of the existing flap valve within the exhalation port 22 of the respirator. In this manner, it is permissible to alternatively withdraw gas for analysis from a location on the inboard side of the existing flap valve or on the outboard side thereof. In a preferred embodiment, the existing flap in the exhalation port is removed completely and the tubing 50 is terminated at the location 65.

The housing 44 is provided at its outboard open end 46, at a location interiorly of the housing 44 and adjacent the open end 46, with a spider 66 which has multiple arms 68 and 70 that extend radially inward from the interior of the wall 52 to define a central receptacle 72. Within the receptacle 72 there is received a central body member 74 of a flap valve 76. This valve further includes a relatively thin flexible circular flap 78 which extends radially outward from the body member 74 to engage, at its peripheral circumference, an annular surface 80 on an annular inwardly projecting shoulder 82 of the housing 44 to effectively close the opening 46 of the housing 44 against inward movement of gas into the chamber 54.

As will be readily recognized, the flexible nature of the flap 78 permits easy movement of gas from the interior of the chamber 54 through the flap valve 76 to the ambient atmosphere externally of the respirator. In the depicted embodiment, the flap valve 76 is provided with a tip 79 interiorly of the chamber 54 intended to be an aid in inserting the body member 74 within the receptacle 72.

Adjacent the end 46 of the housing 44 and on the exterior circumference thereof, there is provided an annular shoulder 86 which is suitable to receive the conventional guard associated with an exhalation valve of a respirator.

In accordance with the method of use of the present attachment in the testing of a respirator, the usual guard member of the exhalation valve of the respirator is removed, along with the existing flap valve in the respirator. The present attachment with its accompanying flap valve is affixed to the existing exhalation valve with the sampling tube 50 terminating contiguous to the exhalation port of the respirator. As desired, the guard can be affixed to the outboard end of the present attachment. Appropriate gas sampling connection is made to the sampling port of the affixed attachment. The respirator is then applied to the face of the user and adjusted for initial fit. The wearer, with the respirator in place, is placed within a chamber containing a simulated hazardous environment and directed to breathe. As desired, the wearer can be instructed to simulate movement that would be encountered by him in his day to day use of the respirator. During the course of these latter activities, gas samples are withdrawn through the port in the present attachment and analyzed for the hazardous environment. Upon the detection of such simulated hazardous substance, the wearer is instructed as to adjustment of the fit of the respirator to his face, as required, until the target concentration of simulated hazardous substance is noted at the analyzer (normally zero concentration). Thereupon, the user is removed from the environment and the present attachment is removed from the respirator. The flap valve is then replaced in the exhalation port and the guard member positioned as originally existing. The respirator is then kept by the user and employed in his day to day activities with the confident knowledge that the respirator is properly fitted to his individual facial features.

The present attachment is also useful in testing respirators applied to manikins, etc. in determining an engineered value for a particular combination of the respirator and filter. Specifically, an "off the shelf" respirator and filter combination may be fitted with the present attachment which is connected to an appropriate analyzer, and the combination fitted on a manikin or the like, disposed within an actual challenge substance atmosphere. After assuring that the respirator is securely fitted to the manikin, as by temporarily sealing off the filter elements and attempting to draw air inwardly of the respirator, the respirator and filter can then be tested at various concentrations of the challenge substance until the substance is noted to pass through the filter. Thereupon the concentration of the substance within the testing enclosure is determined and this value is noted. This latter concentration is then determined as a multiple of the TLV of the material under test and such multiple is assigned as the engineered number for this particular respirator and filter combination with respect to the substance under test. It will immediately be obvious that a very large number of respirators and filter combinations can be tested very rapidly employing the attachment of the present invention, it merely being required that the respirator have affixed thereto the present attachment with its filters in place being secured to the face of a manikin and a manikin disposed in an environment containing the substance under investigation with respect to the particular respirator and filter combination. Therefore, the present attachment is useful in testing respirators and filter combinations generally and also useful in testing the fit of the respirator in place on the face of the user who is to be employing the respirator in day to day activities.

What is claimed is:

1. A disposable attachment for use in testing in situ the fit to the face of a user of a respirator of the negative pressure type having an exhalation member comprising:

a tubular housing having wall means and first and second open opposite ends and defining a chamber therebetween, said first end including means releasably engaging said exhalation member thereby securing said housing to said respirator and defining a fluid flow path between the interior of said respirator and said chamber, flap valve means disposed in closing relationship with said second end of said housing, said valve permitting the outward flow of a gaseous environment from within said respirator to the exterior of said housing when a user exhales and prohibiting gaseous flow inwardly of said respirator via said valve, tubular means extending through said housing wall and defining a fluid flow path between the exterior of said housing and said chamber at a location contiguous to said exhalation member.

2. The disposable attachment of claim 1 wherein said wall means is resiliently deflectable adjacent said first end thereof.

3. The disposable attachment of claim 2 wherein said wall means is provided with a reduced thickness in the area of said first end to enhance deflection of said wall means.

4. The disposable attachment of claim 1 and including annular shoulder means disposed on the outer circumference of said housing adjacent the second end thereof, and guard means removably disposed on said second end and engaging said shoulder means.

5. The disposable attachment of claim 1 and including seal means interposed between said exhalation member and said attachment, said seal means being disposed interiorly of said housing about the periphery thereof and in position to engage said exhalation member and prevent the flow of gas inwardly or outwardly of said respirator at the juncture of said attachment and said exhalation member.

6. A disposable attachment for use in testing a respirator of the negative pressure type having an exhalation member including an annular shoulder defined about the outer circumference thereof comprising:

a generally tubular housing having wall means and opposite open ends, the first one of said ends being adapted to receive therein said exhalation member and multiple lug means disposed about the inner circumference of said first end and releasably engaging said annular shoulder when said housing receives said exhalation member, the second one of said ends including an annular shoulder defined on the outer circumference thereof, a spider disposed within said housing at a location inside said housing adjacent to but spaced inwardly from said second open end of said housing and including a central receptacle, resilient flap valve means including a central resilient post member, said post member being adapted to be received within said central receptacle in said spider to position said flap valve means on the outboard side thereof, thereby positioning said flap valve means in closing relationship to said second end of said housing, said valve permitting the outward flow of a gaseous environment from within said respirator to the exterior of said housing and prohibiting gaseous flow inwardly of said respirator via said valve, tubular means extending through the wall of said housing and providing fluid communication between the outside of said housing and the inside of said housing at a location inboard of said flap valve means and proximate to said exhalation member, and annular seal means disposed between said housing and said exhalation member at the juncture therebetween.

7. A method for testing in situ the fit to the face of a user of a respirator of the negative pressure type having an exhalation port including an exhalation valve closing said port except during exhalation by a user, comprising the steps of securing to said exhalation port a test member including exhalation valve means associated therewith, positioning a user with said respirator in place thereon in an environment comprising a test material incapable of entering said respirator during normal breathing by a user except by reason of a misfit of said respirator, causing a user to breathe while in said environment, withdrawing through said test member a portion of the gaseous environment within said respirator from a location contiguous to said exhalation port, analyzing said withdrawn gaseous portion for the presence of said material, and removing said test member.

8. The method of claim 7 and including the steps of defeating said exhalation valve associated with said exhalation port, and after completion of testing, reactivating said exhalation valve.

* * * * *